(No Model.)

J. B. PURSSELL.
BENCH DOG.

No. 458,187. Patented Aug. 25, 1891.

Witnesses.
Stephen A. Pope
George Pope

Inventor.
James B. Purssell

UNITED STATES PATENT OFFICE.

JAMES B. PURSSELL, OF BOSTON, MASSACHUSETTS.

BENCH-DOG.

SPECIFICATION forming part of Letters Patent No. 458,187, dated August 25, 1891.

Application filed October 23, 1886. Serial No. 217,077. (No model.)

*To all whom it may concern:*

Be it known that I, JAMES B. PURSSELL, a citizen of the United States, residing at Boston, in the State of Massachusetts, have invented a new and useful Bench-Dog or Bench-Hook, as they are sometimes called, of which the following is a specification.

My invention consists in having the jaw of the dog formed on or attached to a hook, which is hinged to the surface-plate at a point in front of the jaw in such a position that a pressure exerted horizontally against the teeth of the jaw causes it to draw downward, and thereby hold the wood being planed firmly to the bench. I attain this by the mechanism illustrated in the accompanying drawings, in which—

Figure 1:
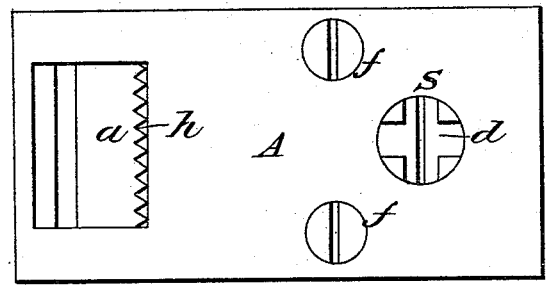
Figure 2:
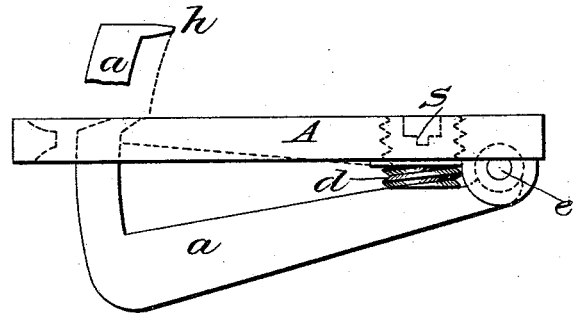
Figure 3:
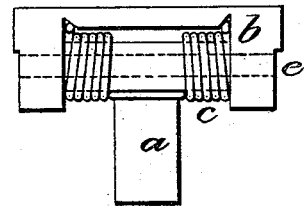
Figure 4:
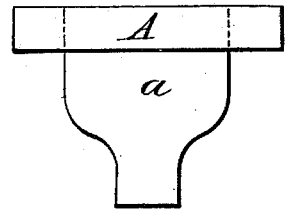

Figure 1 is a top view of the dog as it is fastened in the bench. Fig. 2 is a vertical section of Fig. 1. Figs. 3 and 4 are end views of Fig. 2.

Similar letters refer to similar parts throughout the several views.

$a$ is the hook on which the teeth $h$ are formed, (shown in Fig. 2,) raised to its full height; $e$, the pin on which the hook swings; $d$, the regulating-screw with transverse slots in the upper end, in one of which is countersunk a smaller slot $s$, to admit the point of a screwdriver; but the screw is intended usually to be turned by placing the end of the thumb or finger at the intersection of the slots, at the same time pressing down the jaw to relieve the screw of the pressure of the spring and allow it to turn easily.

In Fig. 3 is shown the right and left hand coilspring $c\,c$ wound around the T-shaped end of the hook $a$, with the connecting portion of the spring passing across the shank of the hook, the ends of the spring being held in V-shaped slots in the end of the surface-plate.

In Fig. 1 is shown the top of the regulating-screw $d$ and the screws $f\,f$, by which the plate is fastened to the bench. The regulating-screw is of such length that its top end will be even with the top of the plate when the jaw is raised to its full height.

Having described my invention, I desire to secure by Letters Patent—

1. The combination, in a bench-dog, of the hook $a$, pivotally fastened to the surface-plate by and rotating on the pin $e$ and held at any desired point by the regulating-screw $d$, and the spiral spring $c\,c$, wound around the T-shaped end of the hook through which the pin $e$ passes, said spring pressing the hook upward against the screw $d$, all substantially as described, and for the purpose set forth.

2. In a bench-dog, the surface-plate A, at one end of which is hinged the hook $a$, and having at the same end a regulating-screw $d$ and at the other a rectangular opening through which the jaw of the dog rises, said jaw being formed on and integral with the hook $a$, all substantially as described.

JAMES B. PURSSELL.

Witnesses:
CHARLES F. HALL,
JAMES POPE.